United States Patent
Hurley et al.

(10) Patent No.: US 10,972,868 B2
(45) Date of Patent: Apr. 6, 2021

(54) ADAPTIVE INTER-RANGING NETWORK

(71) Applicant: Johnson Controls Technology Company, Auburn Hills, MI (US)

(72) Inventors: James B. Hurley, Inniscarra (IE); Michael G. Cronin, Crosshaven (IE); Donagh S. Horgan, Cork (IE); Graham M. Baitson, Dublin (IE)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/378,033

(22) Filed: Apr. 8, 2019

(65) Prior Publication Data

US 2020/0037108 A1 Jan. 30, 2020

Related U.S. Application Data

(63) Continuation of application No. 16/044,390, filed on Jul. 24, 2018, now Pat. No. 10,299,079.

(51) Int. Cl.
| | |
|---|---|
| *H04W 4/02* | (2018.01) |
| *H04W 4/90* | (2018.01) |
| *A62C 99/00* | (2010.01) |
| *H04W 4/70* | (2018.01) |
| *H04W 4/08* | (2009.01) |
| *H04W 4/33* | (2018.01) |
| *H04W 4/029* | (2018.01) |

(52) U.S. Cl.
CPC ........... *H04W 4/027* (2013.01); *A62C 99/009* (2013.01); *H04W 4/023* (2013.01); *H04W 4/08* (2013.01); *H04W 4/33* (2018.02); *H04W 4/70* (2018.02); *H04W 4/90* (2018.02); *H04W 4/029* (2018.02)

(58) Field of Classification Search
CPC ........ H04W 4/027; H04W 4/70; H04W 4/029
USPC ................... 455/456.1, 421, 422.1, 418, 518
See application file for complete search history.

(56) References Cited

U.S. PATENT DOCUMENTS

| | | | |
|---|---|---|---|
| 7,952,522 B2 * | 5/2011 | Hohl | G01S 5/0289 342/463 |
| 10,299,079 B1 * | 5/2019 | Hurley | H04W 4/023 |
| 2005/0190733 A1 * | 9/2005 | Ishidoshiro | H04W 48/20 370/338 |
| 2005/0232200 A1 * | 10/2005 | Jeong | H04W 52/0216 370/331 |
| 2008/0080441 A1 * | 4/2008 | Park | H04W 64/00 370/338 |
| 2010/0246405 A1 * | 9/2010 | Potkonjak | G01S 5/0226 370/241 |
| 2013/0130742 A1 | 5/2013 | Dietz et al. | |
| 2013/0324154 A1 | 12/2013 | Raghupathy et al. | |
| 2017/0109723 A1 | 4/2017 | Woo | |

* cited by examiner

*Primary Examiner* — Nghi H Ly
(74) *Attorney, Agent, or Firm* — Foley & Lardner LLP

(57) ABSTRACT

An illustrative embodiment disclosed herein is a network including a first local group of first node devices, a second local group of second node devices, and a new node device. The new node device has a processor with programmed instructions to range to each of the first node devices, collect ranging data from each of the first node devices, calculate a plurality of distances based on the ranging data, and send the plurality of distances to each of the second node devices.

20 Claims, 9 Drawing Sheets

ADAPTIVE INTER-RANGING NETWORK

CROSS-REFERENCE TO RELATED APPLICATION

This application is a continuation of and claims priority under 35 U.S. § 120 from U.S. patent application Ser. No. 16/044,390, filed Jul. 24, 2018, titled "ADAPTIVE INTER-RANGING NETWORK," the entire contents of which are incorporated herein by reference for all purposes.

BACKGROUND

The present disclosure relates generally to ranging networks and more particularly to an adaptive inter-ranging network for first responders.

In emergencies, such as fires, accurate location data for individual first responders allows emergency response site controllers to plan routes to important locations, identify and assist individuals in peril, give directions to first responders, and tag areas of interest. In the context of firefighting operations, in particular, lack of accurate location information and poor communication has resulted in serious injuries and deaths because firefighters rely heavily on information provided by their incident command.

SUMMARY

An illustrative embodiment disclosed herein is a network including a first local group of first node devices. Each of the first node devices includes a first processor with programmed instructions to range to other of the first node devices. The network further includes a second local group of second node devices. Each of the second node devices includes a second processor with programmed instructions to range to other of the second node devices. The network further includes a new node device including a third processor with programmed instructions to range to each of the first node devices, collect ranging data from each of the first node devices, and calculate a plurality of distances based on the ranging data. Each of the plurality of distances is associated with one of the first node devices. The third processor has further programmed instructions to send the plurality of distances to each of the second node devices.

In some embodiments, the network has a network mode. The third processor may have further programmed instructions to receive an indication that the network mode has changed from standard mode to adaptive mode.

In some embodiments, the first local group, the second local group, and the new node device are members of a plurality of node devices. The network may have a plurality of standard timeslots. The third processor may have further programmed instructions to change from the standard mode to the adaptive mode in response to a first number of the plurality of node devices being greater than a second number of the plurality of standard timeslots.

In some embodiments, in response to the network changing from the standard mode to the adaptive mode, the third processor has further programmed instructions to join the first local group, range to the first node devices, collect the ranging data from the first node devices, and send the plurality of distances to the second node devices.

In some embodiments, the third processor has further programmed instructions to join the first local group based on utility criteria including proximity to each of the first node devices and a mobility state of the new node device. The mobility state may include a fixed state and mobile state. The fixed state indicates that the new node device is stationary or moving at a first velocity below a pre-determined velocity. The mobile state may indicate that the new node device is moving at a second velocity above the pre-determined velocity.

In some embodiments, the first local group includes mobile node devices. Each of the mobile node devices may have the mobile state. The utility criteria may include that the new node device is more proximate to an average of the first node devices than a pre-determined distance and that the new node device has the fixed state.

In some embodiments, the third processor has further programmed instructions to determine a plurality of locations based on the plurality of distances. Each of the plurality of locations may correspond to one of the first node devices.

In some embodiments, the new node device has a fixed state indicating that the new node device is stationary or moving at a first velocity below a pre-determined velocity. A dual node device of the first node devices may have a mobile state indicating that the dual node device is moving at a second velocity above the pre-determined velocity. A first location of the plurality of locations may correspond to the dual node device. The first location may have a first confidence level associated therewith.

In some embodiments, the second local group includes the dual node device. The dual node device may include a fourth processor having programmed instructions to range to each of the second node devices, collect second ranging data from each of the second node devices, and calculate a plurality of second distances based on the second ranging data. Each of the plurality of second distances may be associated with one of the second node devices. The fourth processor may have further programmed instructions to determine a plurality of second locations based on the plurality of second distances. Each of the plurality of second locations may correspond to one of the second node devices. Each of the plurality of second locations may have a second confidence level associated therewith. The second confidence level may be lower than the first confidence level.

Another illustrative embodiment disclosed herein is a method including ranging, by a new node device, to each of a first local group of first node devices, collecting, by the new node device, ranging data from each of the first node devices, and calculating, by the new node device, a plurality of distances based on the ranging data. Each of the plurality of distances is associated with one of the first node devices. The method further includes sending, by the new node device, the plurality of distances to each of a second local group of second node devices.

In some embodiments, the first local group, the second local group, and the new node device are members of a plurality of node devices of a network. The network may have a network mode. The method may further include receiving, by the new node device, an indication that the network mode has changed from standard mode to adaptive mode.

In some embodiments, the network has a plurality of standard timeslots. The method may further include determining that a first number of the plurality of node devices is greater than a second number of the plurality of standard timeslots and changing the network from the standard mode to the adaptive mode in response to a determination that the first number of the plurality of node devices is greater than the second number of plurality of standard timeslots.

In some embodiments, joining the first local group, ranging to the first node devices, collecting the ranging data from the first node devices, and sending the plurality of distances to the second node devices are performed in response to receiving the indication that the network mode changes from the standard mode to the adaptive mode.

In some embodiments, the method further includes joining, by the new node device, the first local group based on utility criteria. The utility criteria may include proximity to each of the first node devices and a mobility state of the new node device. The mobility state may include a fixed state and mobile state. The fixed state may indicate that the new node device is stationary or moving at a first velocity below a pre-determined velocity. The mobile state may indicate that the new node device is moving at a second velocity above the pre-determined velocity.

In some embodiments, the first local group includes mobile node devices. Each of the mobile node devices may have the mobile state. The utility criteria may include that the new node device is more proximate to an average of the first node devices than a pre-determined distance and that the new node device has the fixed state.

In some embodiments, the method further includes determining, by the new node device, a plurality of locations based on the plurality of distances. Each of the plurality of locations may correspond to one of the first node devices.

In some embodiments, the new node device has a fixed state indicating that the new node device is stationary or moving at a first velocity below a pre-determined velocity. A dual node device of the first node devices may have a mobile state indicating that the dual node device is moving at a second velocity above the pre-determined velocity. A first location of the plurality of locations may correspond to the dual node device. The first location may have a first confidence level associated therewith.

In some embodiments, the second local group includes the dual node device. The method may further include ranging, by the dual node device, to each of the second node devices, collecting, by the dual node device, second ranging data from each of the second node devices, and calculating, by the dual node device, a plurality of second distances based on the second ranging data. Each of the plurality of second distances may be associated with one of the second node devices. The method may further include determining, by the dual node device, a plurality of second locations based on the plurality of second distances. Each of the plurality of second locations may correspond to one of the second node devices. Each of the plurality of second locations may have a second confidence level associated therewith. The second confidence level may be lower than the first confidence level.

Another illustrative embodiment disclosed herein is a non-transitory computer-readable storage medium having instructions stored thereon that, upon execution by a computing device, causes the computing device to perform operations including ranging to each of the first node devices, collecting ranging data from each of the first node devices, and calculating a plurality of distances based on the ranging data. Each of the plurality of distances is associated with one of the first node devices. The operations further include sending the plurality of distances to each of a second local group of second node.

In some embodiments, the first local group and the second local group are members of a plurality of node devices of a network. The network may have a network mode and a plurality of standard timeslots. The operations may further include receiving an indication that the network mode has changed from standard mode to adaptive mode. Receiving the indication that the network changes from the standard mode to the adaptive mode may be in response to a first number of the plurality of node devices being greater than a second number of the plurality of standard timeslots.

Further details of aspects, objects, and advantages of the systems and methods described herein are provided below in the detailed description, drawings, and claims. Both the foregoing general description and the following detailed description are exemplary and explanatory, and are not intended to be limiting as to the scope of the systems and methods described herein. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Figure 1:
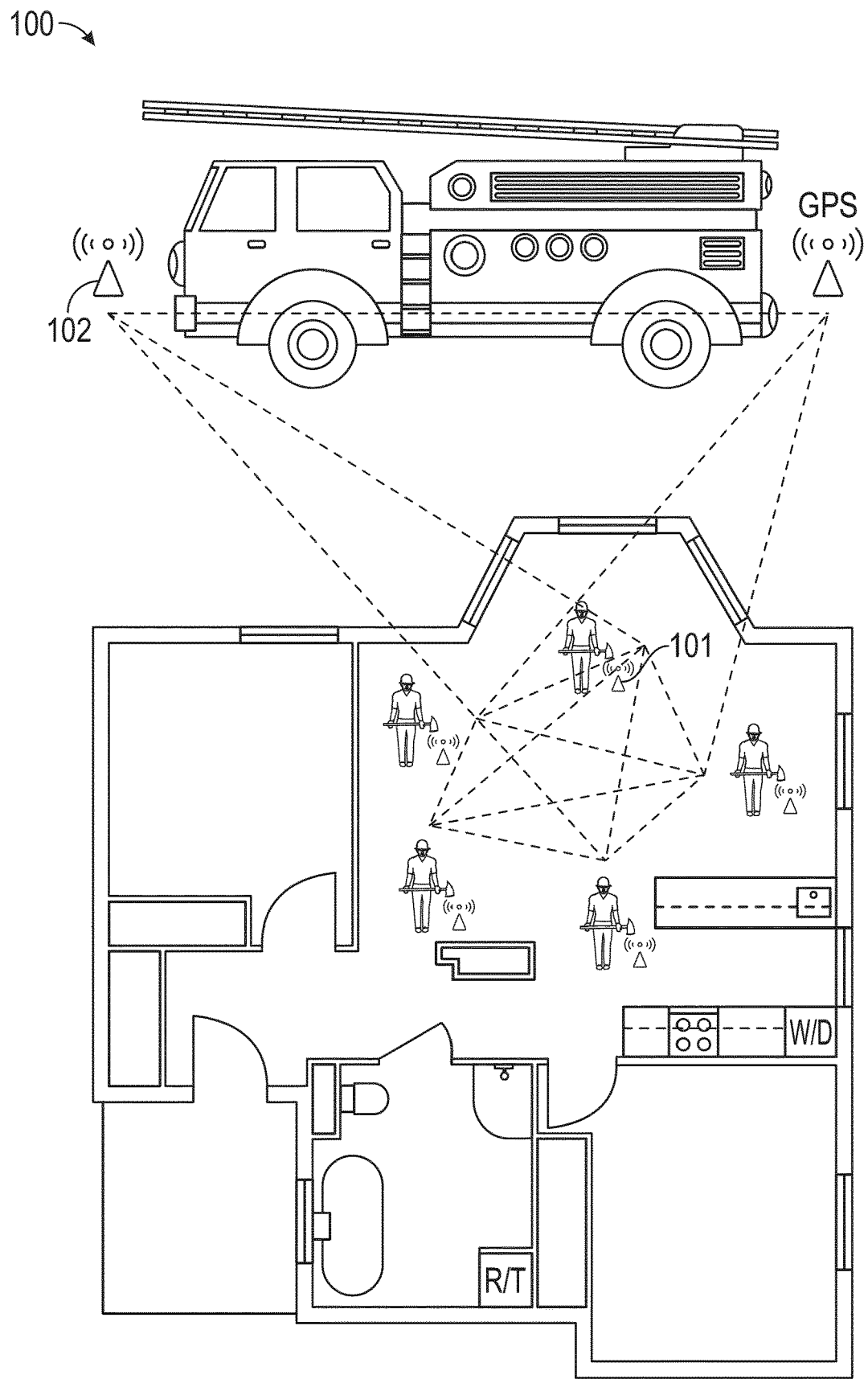
FIG. 1 illustrates an adaptive inter-ranging network in an indoor first responder situation, according to an exemplary embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In all areas where systems like GPS, GLONAAS, and others are ineffective, in indoor areas for example, there is a common challenge for locating people and things accurately, particularly in scenario of emergency or disaster when a common, reliable infrastructure cannot be relied upon. A good example of this is in first response scenarios, particularly in the case of fire fighters: The major challenge for all types of fire incidents ranging from small environmental fires to large property fires, is to know and visualize exactly where all firefighters are at all times. Lack of location information in addition to poor communication can result in serious injury and even death, as firefighters rely on helping each other based on the information provided by the incident commander.

Prior solutions for location tracking networks in first response scenarios include Global Navigation Satellite System (GNSS) location systems, Bluetooth Low Energy (BLE) and Ultra-wide band (UWB) technologies, Low-Power Wide-Area Network (LPWAN), WiFi or cellular networks, and two-way ranging networks. The prior solutions suffer many technological problems such as: (a) being inaccurate, unreliable or unavailable without line of sight, pre-installed common infrastructure, or surveying; (b) requiring that all mobile nodes be within range of enough anchor nodes to use the ranging data to predict tag locations; and (c) a lack of a mechanism for the network to adapt based on having more nodes than available time slots.

Disclosed herein is an adaptive inter-ranging network. One aspect of the technological solution is that the network is accurate without requiring line of sight, pre-installed common infrastructure, or surveying. Each node device on the network ranges to a collectively chosen set of neighboring node devices based on a combination of proximity and the benefit of the information. The network updates all node devices in the network with the ranges of all other known ranges to each device. This will allow for an accurate location of each node device in the network to be estimated using a location solving mechanism based on the ranging data. In some embodiments of this disclosure, conventional anchor node devices that are stationary may be placed in certain key locations (e.g. on a fire truck). However, the network may be hosted entirely or almost entirely on small terminal devices carried by or attached to first responders or non-personal first response assets (e.g. drones). In first responder scenarios, some or all of the first responders are moving at a slow enough rate that they can have anchor node functionality. This frees or reduces the need for the conventional anchor node devices.

Another aspect of the technological solution is that the network does not require all mobile node devices be within range of enough anchor node devices to use the ranging data to predict tag locations. Trilateration algorithms are used to predict the locations of node devices that are within range of the known node devices that are stationary or moving slower than a pre-determined speed. Then these node devices will then be used as known fixed tags with a lower confidence value to range against for node devices that could not see enough known fixed tags up to this point. The overall confidence of the estimated position decreases depending on how many iterations deep the stationary/slow-moving node devices were used in its calculation.

Another aspect of the technological solution is that the network provides a mechanism for adapting in response to there being more node devices in the network than there are timeslots. When all of the available timeslots are occupied in a standard mode, the network switches to its adaptive mode. In the adaptive mode, the network will include multiple local groups. The network assigns node devices to one of the local groups and assigns timeslots of that group accordingly. Thus, number of the timeslots grows in proportion to number of groups created.

FIG. 1 illustrates an adaptive inter-ranging network 100 in an indoor first responder situation. A plurality of node devices 101 are carried by first responder personnel in an indoor environment. Tracking the location of and relaying information between the firefighters is critical because poor communication can result in serious injury or death. In some embodiments, additional stationary node devices 102 are placed on or around emergency vehicles. The plurality of node devices 101 range to each other and to the stationary node devices 102 to determine distances between node devices, and ultimately, locations of the plurality of node devices.

Figure 2:
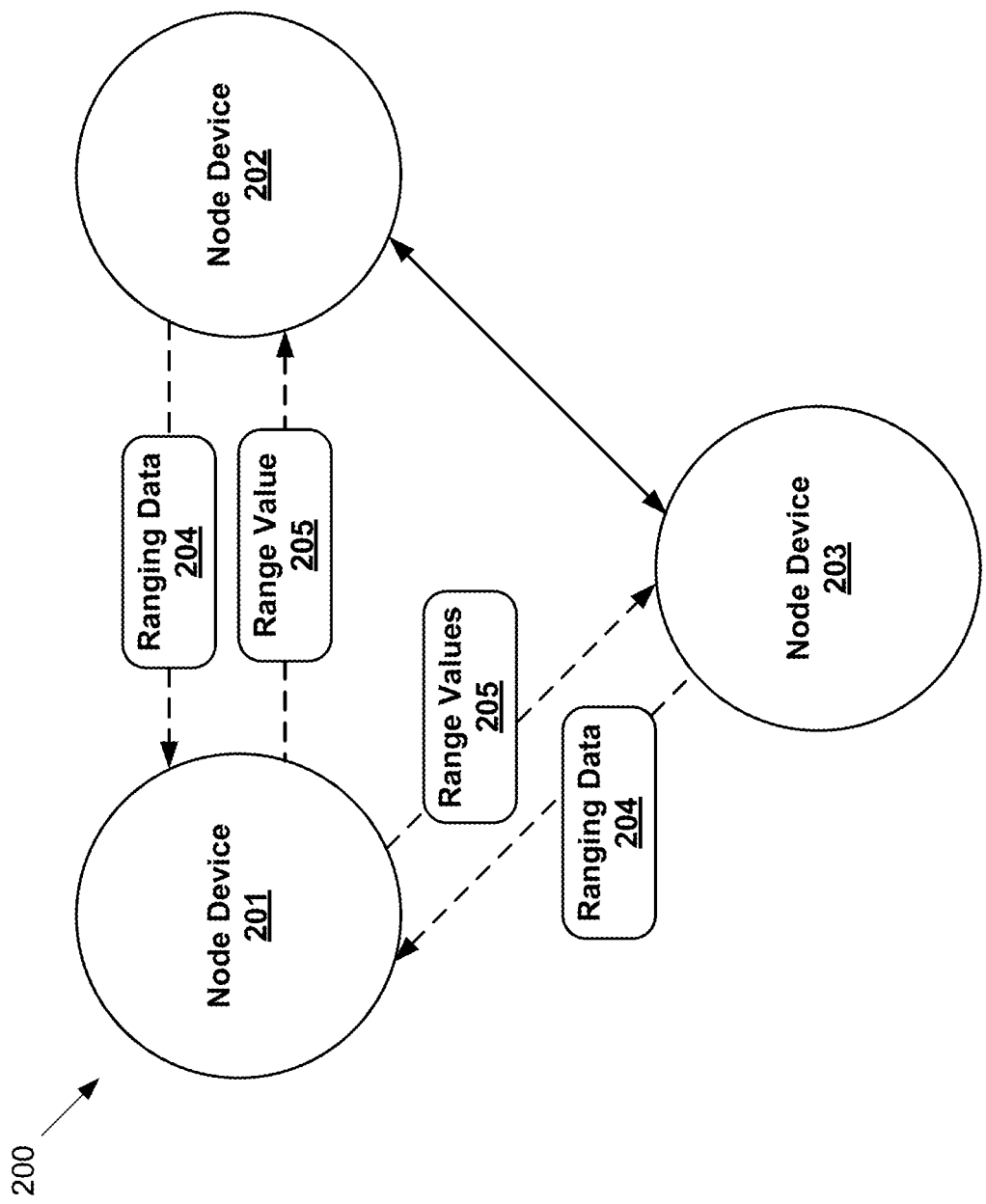
FIG. 2 is a block diagram of a standard network which may be used as the adaptive inter-ranging network of FIG. 1, according to an exemplary embodiment.

FIG. 2 is a block diagram of a standard network 200 which may be used as the adaptive inter-ranging network of FIG. 1, according to an exemplary embodiment. The standard network 200 includes a plurality of node devices 201, 202, and 203. Additional, fewer, or different node devices may be included depending on the implementation. The node devices 201, 202, and 203 are communicatively coupled. The node device 201 is referred to as an anchor node device herein and the node device 202 is referred to as a tag node device herein, although in some embodiments, the node device 201 may be the tag node device and the node device 202 may be the anchor node device. The anchor node device 201 is understood to be ranging to another node device, and the tag node device 202 is understood to be a node device being ranged. The anchor node device 201 can be mobile or stationary. All of the node devices in the standard network 200 except for the anchor node device 201 are referred to as other node devices herein.

The anchor node device 201 is configured to identify a timeslot associated therewith. The anchor node device 201 is further configured to range to the tag node device 202 (i.e., a ranging event) during the timeslot. In some embodiments, ranging to the tag node device 202 includes sending a ranging message. In other embodiments, ranging to the tag node device 202 includes receiving a poll from the tag node device 202 and sending a ranging response to the tag node device 202. In some embodiments, the anchor node device 201 is configured to range to each of the other node devices.

The anchor node device 201 is further configured to collect ranging data 204 from the tag node device 202 during the timeslot. The ranging data 204 may include one or more times of arrival corresponding to the ranging event. In some embodiments, one of the times of arrival is associated with the ranging message. In other embodiments, the ranging data 204 includes one or more times of departure corresponding to the ranging event. In yet other embodiments, the ranging data 204 includes other data such as direction, speed, elevation, vital statistics of the tag node device 202, and the like. In some embodiments, the ranging data 204 includes a combination of some or all of the one or more of the times of arrival, the one or more of the times of departure, and the other data. In some embodiments, the anchor node device 201 is configured to collect ranging data 204 from each of the other node devices 202 and 203. The purpose of collecting the ranging data 204 is to calculate range values 205 of each of the other node devices 202 and 203, and ultimately, the locations of each of the other node devices 202 and 203.

In some embodiments, the anchor node device 201 is further configured to calculate the range value 205 of the tag node device 202. The range value 205 is a distance between an anchor such as the anchor node device 201 and a tag such as the tag node device 202. The range value 205 may be calculated by the anchor node device 201 based on the ranging data 204. In some embodiments, the range value 205 is calculated by the tag node device 202 and the range value 205 is sent by the tag node device 202 to the anchor node device 201. In some embodiments, the anchor node device 201 is configured to calculate the range values 205 of each of the other node devices 202 and 203. The purpose of calculating the range values 205 is to determine the location of the node devices using trilateration or similar techniques.

In some embodiments, the anchor node device 201 is further configured to send the range value 205 to each of the other node devices 202 and 203 in the standard network 200 during the timeslot. In some embodiments, the anchor node device 201 is configured to send the range values 205 of each of the other node devices 202 and 203. The purpose of sending the range values 205 to the other node devices 202 and 203 is to enable the other node devices 202 and 203 to calculate locations of some of the node devices 201-203 using trilateration or similar techniques. In some embodiments, the anchor node device 201 is configured to send the ranging data 204 to the other node devices 202 and 203 in the standard network 200 and the other node devices 202 and 203 are each configured to calculate the range value 205, and ultimately, the location of the other node devices 202 and 203.

The standard network 200 has a number of timeslots and a number of the node devices. As new node devices join the standard network 200, each of the new node devices may be assigned one of the available timeslots. Eventually, the number of the timeslots in the standard network 200 is less than the number of the node devices in the network 200 (i.e., there are no remaining available timeslots). In response to the number of the timeslots in the standard network 200 being less than the number of the node devices in the standard network 200, standard network 200 is configured to switch to an adaptive network 300, shown in FIG. 3 (i.e. a mode of the adaptive inter-ranging network 100 in FIG. 1 switches from standard mode to adaptive mode).

The adaptive network 300 may create local groups to perform ranging, data collection, and range calculation at the local level rather than across the across the adaptive network 300. A network control circuit within a new node device is configured to assign the new node device to one of the local groups based on criteria designed to improve the usefulness or accuracy of the collected data. The network control circuit may be configured to gather data from all of the node devices in the adaptive network 300. In some embodiments, the network control circuit is the network control circuit 512 in FIG. 5. In some embodiments, the network control circuit may assign the new node device to more than one of the local groups. In some embodiments, the criteria may include a maximum proximity criterion. A ranging circuit within the new node device of the new node device may be configured to determine the proximity to local group node devices. In some embodiments, the ranging circuit is the ranging circuit 511 of FIG. 5. If proximity (i.e., the range value 205) between the new node device and the local group node devices is less than a pre-determined distance, then the new node device may meet the maximum proximity criterion. In some embodiments, finding the proximity between the new node device and the local group node devices includes determining a plurality of individual proximities between the new node device and each of the local group node devices. The ranging circuit may compute the average of the plurality of individual proximities as the proximity and may send the proximity to the network control circuit. In other embodiments, finding the proximity between the new node device and the local group node devices includes calculating an average location of all of the local group node devices and finding the proximity between the new node device and the average location. The purpose of the maximum proximity criterion is to avoid having the new node device being out of range with the local group node devices.

In some embodiments, the criteria may include a minimum proximity criterion. If the proximity between the new node device and the node devices of a local group is greater than a second pre-determined distance less than the first pre-determined distance, then the new node device may meet the minimum proximity criterion. The purpose of having the minimum proximity criterion is to have a diversity in ranging targets so that the new node device is likely to have access to additional useful data.

In some embodiments, the criteria may include a mobility criterion. The mobility criterion may be whether the new node device has a fixed state or a mobile state. The fixed state indicates that the new node device is stationary or moving at a velocity below a pre-determined velocity. The mobile state indicates that the new node device is moving at a velocity above the pre-determined velocity. Where both of the node devices of the ranging event have the fixed state, there is a higher level of certainty associated with the range values 205 and the locations of the node devices than where only one of the node devices in the ranging event have the fixed state. Where one of the node devices of the ranging event have the fixed state, there is a higher level of certainty associated with the range values 205 and the locations of the node devices than where none of the node devices in the ranging event have the fixed state. The level of certainty is referred to confidence level herein. In some embodiments, another mobility criterion may be whether the local group already has a node device having the fixed state. If the local group does not have any node device having the fixed state, the local group may have a higher priority to be assigned the new node device having the fixed state than another local group having a node device having the fixed state. The purpose of having the mobility criteria is to evenly distribute among the local groups the node devices having the fixed state.

Figure 3:
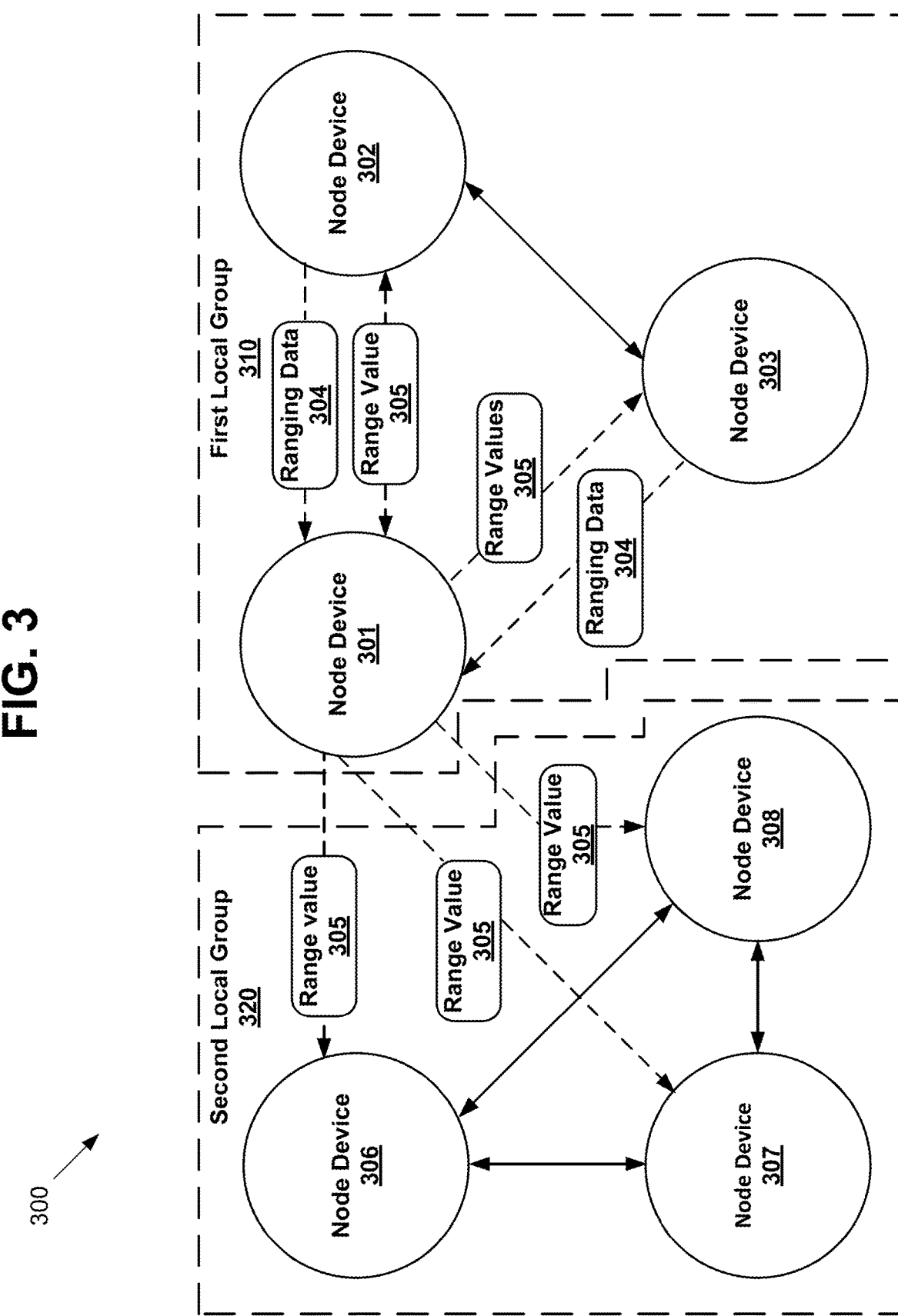
FIG. 3 is a block diagram of an adaptive network which may be used as the adaptive inter-ranging network of FIG. 1, according to an exemplary embodiment.

FIG. 3 is a block diagram of an adaptive network 300 which may be used as the adaptive inter-ranging network of FIG. 1, according to an exemplary embodiment. The adaptive network 300 includes a first local group 310 and a second local group 320. Additional, fewer, or different local groups may be included depending on the implementation. The first local group 310 and the second local group 320 are communicatively coupled. The first local group 310 includes a plurality of first node devices 301, 302, and 303. The second local group 320 includes a plurality of second node devices 306, 307, and 308. Additional, fewer, or different node devices may be included depending on the implementation. The first node devices 301, 302, and 303 are communicatively coupled to each other. The second node devices 306, 307, and 308 are communicatively coupled to each other. In some embodiments, the first node devices 301, 302, and 303 are the node devices 201, 202, and 203 in FIG. 2, respectively. The node device 301 is referred to as an anchor node device. The first node devices 302 and 303 are referred to as other first node devices.

The anchor node device 301 is configured to range to each of the other first node devices 302 and 303 during a timeslot associated with the anchor node device 301. The anchor node device 301 is further configured to collect ranging data 304 from each of the other first node devices 302 and 303 during a timeslot associated with the anchor node device 301. In some embodiments, the ranging data 304 is the ranging data 204 in FIG. 2. The anchor node device 301 may be further configured to calculate range values 305 of each of the other first node devices 302 and 303. In some embodiments, the range values 305 are the range values 205 in FIG. 2. The anchor node device 301 may be further configured the send range values 305 of the first local group 310 to each of the other first node devices 302 and 303 and to each of the second node devices 306, 307, and 308 during a timeslot associated with the anchor node device 301. In some embodiments, the anchor node device 301 is configured so send the ranging data 304 of the first local group 310 to each of the other first node devices 302 and 303 and each of the second node devices 306, 307, and 308 during a timeslot associated with the anchor node device 301.

Figure 4:
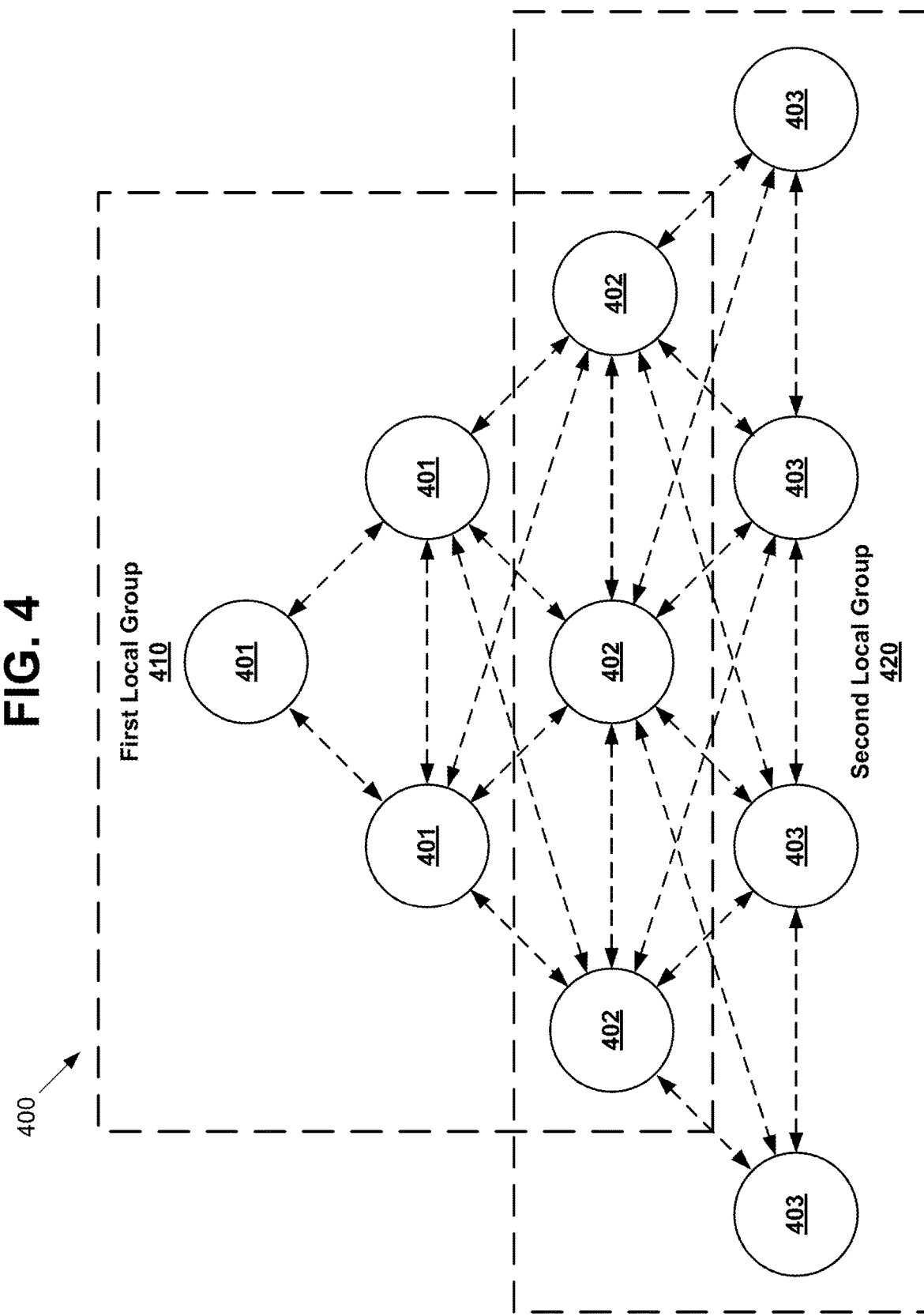
FIG. 4 is a block diagram illustrating a network of overlapping local groups which may be used as the adaptive inter-ranging network of FIG. 1, according to an exemplary embodiment.

FIG. 4 is a block diagram illustrating a network 400 of overlapping local groups which may be used as the adaptive inter-ranging network of FIG. 1, according to an exemplary embodiment. The network 400 includes a first local group 410 that includes a plurality of node devices 401 and a plurality of node devices 402. In some embodiments, the first local group 410 is the first local group 310 in FIG. 3. The network further includes a second local group 420 that includes the plurality of node devices 402 and a plurality of node devices 403. In some embodiments, the second local group 420 is the second local group 320 in FIG. 3. Additional, fewer, or different local groups or node devices may be included depending on the implementation.

In one embodiment, one of the node devices 401 may be configured to range to, collect first ranging data from, and send first range values to the node devices 401 and 402 in the first local group 410. In some embodiments, the first ranging data is the ranging data 304 in FIG. 3 and the first range values are the range values 305 in FIG. 3. The node devices 403 may be out of range with the node devices 401. One of the node devices 402 may be configured to range to, collect second ranging data from, and send second range values to the node devices 402 and 403 in the second local group 420. In some embodiments, the second ranging is the ranging data 304 in FIG. 3 and the second range values are the range values 305 in FIG. 3. One of the node devices 402 may be further configured to send the first range values to the second local group 420 and the second range values to the first local group 410.

A range value (e.g. the one of the range values 305) is associated with two node devices (e.g. the anchor node device 301 and the tag node device 302). The node devices have either the fixed state defined previously in the disclosure or the mobile state defined previously in the disclosure. If the anchor node device 301 and the tag node device 302 both have the fixed state, a level of certainty associated with the range value is the highest. If only one of the anchor node device 301 or the tag node device 302 has a fixed state, then the level of certainty is lower than if both of the node devices have the fixed state. If the anchor node device 301 and the tag node device 302 both have the mobile state, then the level of certainty is lower than if only one of the node devices has the fixed states. Locations that are based on range values of higher levels of certainty have higher levels of certainty than locations that are based on range values of lower levels of certainty. In some embodiments, the node devices 401 have the fixed state, the node devices 402 have the mobile state, and the node devices 403 have a mobile state. The node devices 401 may use a trilateration algorithm to predict the locations of the node devices 402 that are within range of the node devices 401. The node devices 402 may have a lower level of certainty associated with their locations than the level of certainty associated with locations of the node devices 401. The node devices 402 may use the trilateration algorithm to predict the locations of the node devices 403, which may have a lower level of certainty associated with their locations and their range values than the levels of certainty associated with the locations of node devices 402 and the range values between the node devices 401 and node devices 402, respectively. The overall level of certainty of the locations of any node devices may depend on how many iterations deep are the node devices having a fixed state (e.g. the node devices 401) that were used in the calculation of the locations.

Figure 5:
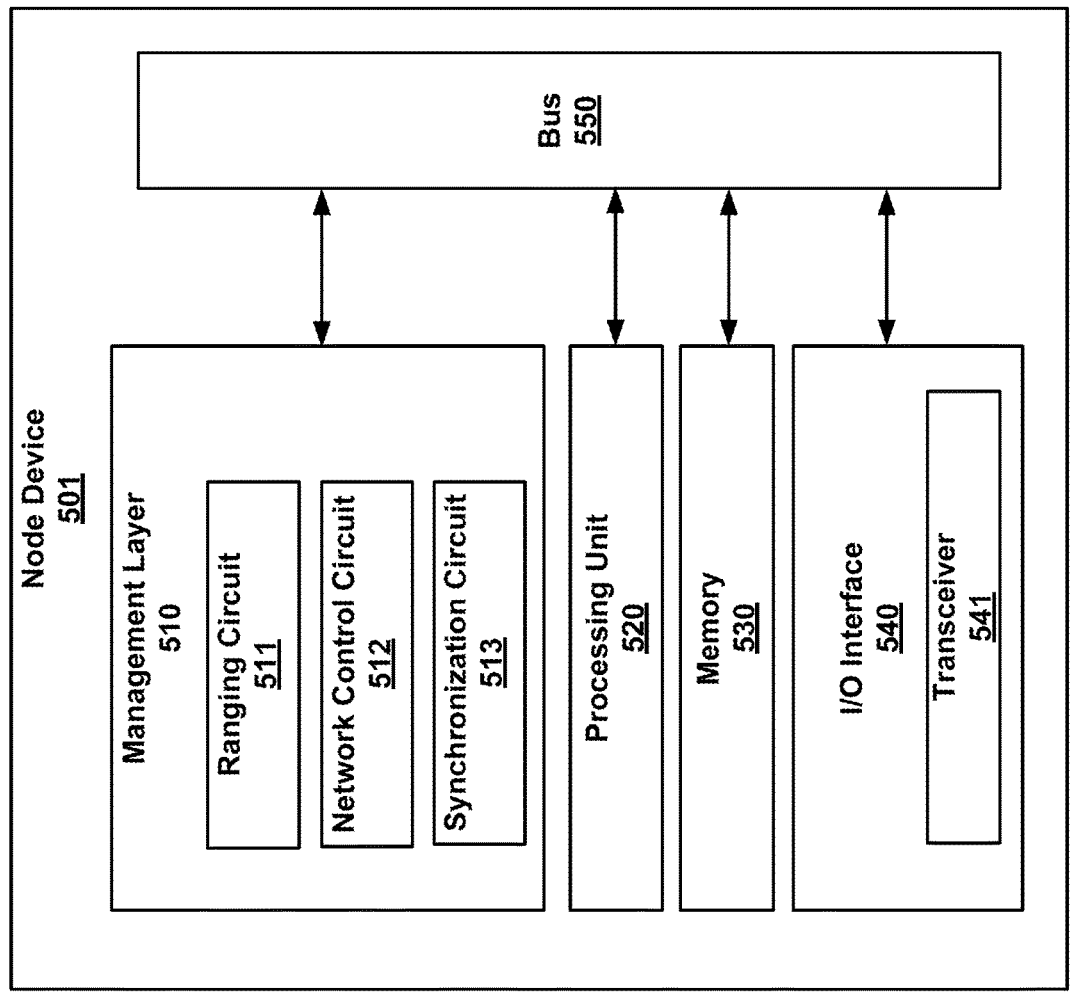
FIG. 5 is a block diagram illustrating one of the node devices of the adaptive inter-ranging network of FIG. 1, according to an exemplary embodiment.

FIG. 5 is a block diagram illustrating one of the node devices 500 of the adaptive inter-ranging network of FIG. 1, according to an exemplary embodiment. Additional, fewer, or different structures may be included depending on the implementation. In one embodiment, a node device 501 may be the node device 301 in FIG. 3. The node device 501 is shown to include a management layer 510 coupled to a communication infrastructure such as bus 550 or network. The management layer 510 is shown to include the ranging circuit 511, the network control circuit 512, and the synchronization circuit 513.

The ranging circuit 511 can be configured to range to other node devices, collect ranging data such as the ranging data 304 in FIG. 3, calculate range values such as the range values 305 in FIG. 3, and send the range values to the other node devices such as the node devices 302, 303, 306, 307, and 308. In some embodiments, the ranging circuit 511 may be configured to calculate locations based on the range values. The ranging circuit 511 can be an application specific integrated circuit (ASIC) or a field-programmable gate array (FPGA). The ranging circuit 511 can be implemented as one or more software components of an operating system running on the node device 501. The ranging circuit 511 can be implemented as one or more software applications installed on the node device 501. The ranging circuit 511 can be stored as instructions in memory 530 and upon execution by a processing unit 520, can cause the node device 501 to perform operations.

The network control circuit 512 may be configured to assign timeslots to node devices as they join the network. In the adaptive network 300, the network control circuit 512 may be configured to determine the local group assignment of the node devices based on criteria to improve the usefulness or accuracy of the data. The network control circuit 512 may be configured to gather data from all of the node devices of the network 200 or the first local group 310. The network control circuit 512 can be an application specific integrated circuit (ASIC) or a field-programmable gate array (FPGA). The network control circuit 512 can be implemented as one or more software components of an operating system running on the node device 501. The network control circuit 512 can be implemented as one or more software applications installed on the node device 501. The network control circuit 512 can be stored as instructions in memory 530 and upon execution by a processing unit 520, can cause the node device 501 to perform operations.

The synchronization circuit 513 may be configured to maintain event synchronization to avoid signal collisions. In some embodiments, the node device 501 may further include a processing unit 520, memory 530, and an input/output ("I/O") interface 540, all of which may be coupled to each other via the bus 550. The synchronization circuit 513 can be an application specific integrated circuit (ASIC) or a field-programmable gate array (FPGA). The synchronization circuit 513 can be implemented as one or more software components of an operating system running on the node device 501. The synchronization circuit 513 can be implemented as one or more software applications installed on the node device 501. The synchronization circuit 513 can be stored as instructions in memory 530 and upon execution by a processing unit 520, can cause the node device 501 to perform operations.

The processing unit 520 is configured to execute one or more sequences of one or more instructions contained in the memory 530. The memory 530 includes non-volatile media and volatile media. Examples of non-volatile media are optical disks, magnetic disks, hard disk drive ("HDD"), and solid state disks ("SSD"). The non-volatile media may comprise programmable read-only memory ("PROM"), erasable programmable read-only memory ("EPROM"), and/or flash memory. Examples of volatile media are cache memory, main memory, and system memory. The volatile media may comprise read-only memory ("RAM"), dynamic read-only memory (DRAM), and/or static read-only memory ("SRAM"). The memory 530 is configured to store instructions that are executed by the processing unit 520. In some embodiments, the memory 530 may be configured to store instructions that are executed by the management layer 510, the ranging circuit 511, the network control circuit 512, and the synchronization circuit 513. In some embodiments, the ranging circuit 511 may be configured to store the ranging data 204, the range values 205, and the locations on the memory 530. In some embodiments, the network control circuit may store timeslot information on the memory 530.

The I/O interface 540 is configured to interface communication between the node devices and other hardware. The I/O interface includes a transceiver 541. The I/O interface may further include a modem, an Ethernet card, a peripheral component interconnect express ("PCIe") card, a network interface controller ("NIC") for communicating with a wire-based network, a wireless NIC ("WNIC") for communicating with a wireless network, such as WI-FI, display, and input devices. In particular embodiments, the node device 501 may include one or more of any such components.

The wireless transceiver 541 is configured to send and receive sensor data. The transceiver 541 is configured to send the range values 205 received from the ranging circuit 511 to the other node devices. The transceiver 541 is also configured to receive the ranging data 204 from the other node devices and send the ranging data 204 to the ranging circuit 511. In some embodiments, the transceiver 541 may be a zero-intermediate-frequency ("zero IF") transceiver. One advantage of zero IF transceivers is that they consume power than most or all other wireless transceiver architectures. In other embodiments, the transceiver 541 architecture may be super-heterodyne, low-IF, slide-IF, or super-regenerative. In some embodiments, the transceiver 541 may be coupled to a modem. The modem modulates and demodulates modulated signals such as ASK, FSK, and PSK.

Figure 6:
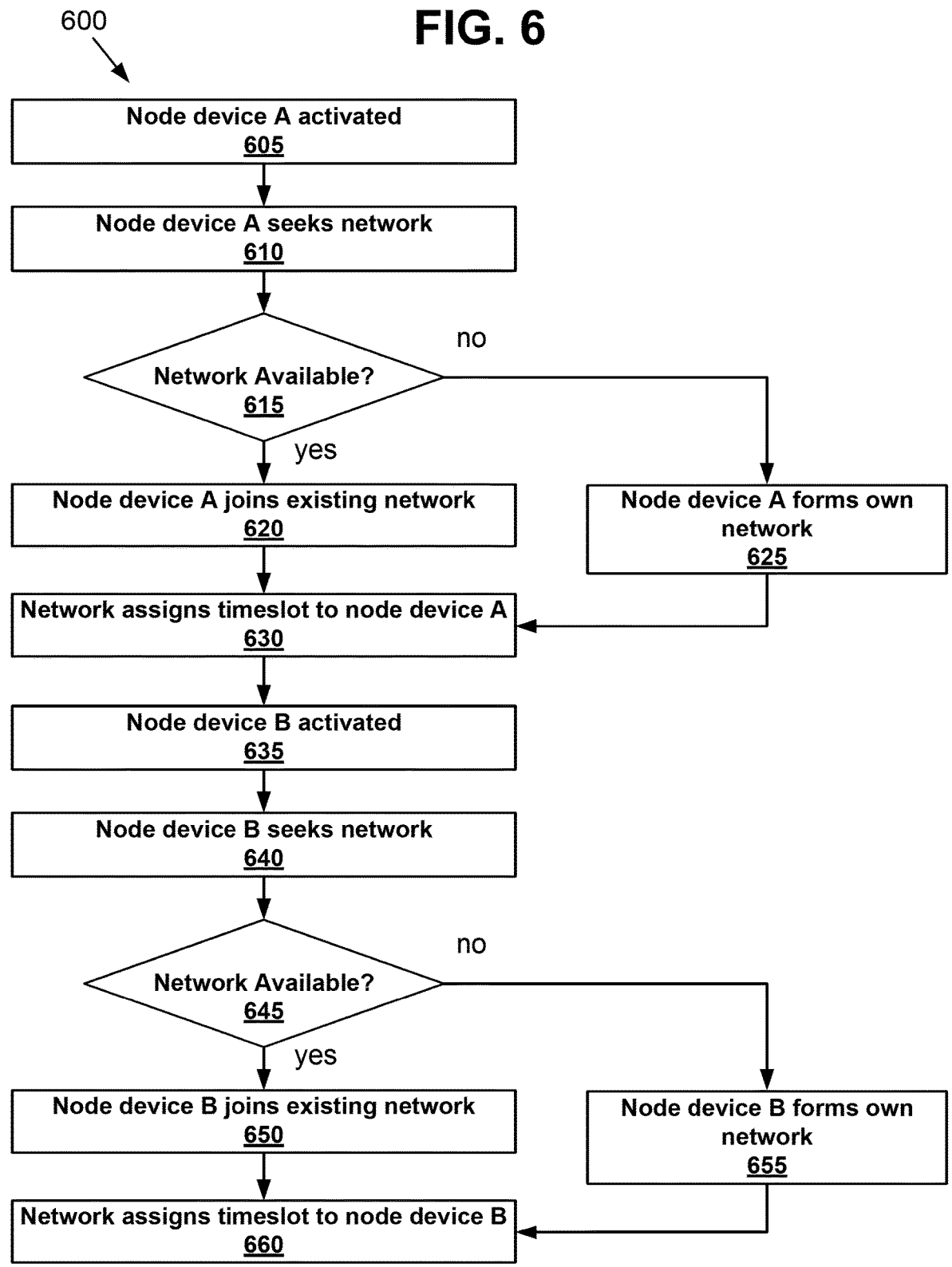
FIG. 6 is a flowchart of a process for assigning event timeslots to node devices joining the network of FIG. 1, according to an exemplary embodiment.

FIG. 6 is a flowchart of a process 600 for assigning event timeslots to node devices joining the network 100 of FIG. 1, according to an exemplary embodiment. At operation 605, node device A is activated. In some embodiments, the node device A is the node device 201 in FIG. 2. At operation 610, the node device A seeks a network. At operation 615, the node device A determines whether the network is available. If the network is available, then at operation 620, the node device A joins the network. If the network is unavailable, then at 625, the node device A forms new network. At operation 625, the network that the node device A is on assigns an event timeslot to the node device A.

The process repeats for the node device B. At operation 635, the node device B is activated. In some embodiments, the node device B is the node device 202 in FIG. 2. At operation 640, the node device B seeks a network. At operation 645, the node device B determines whether the network is available. If the network is available, then at operation 650, the node device B joins the network. If the network is unavailable, then at 655, the node device B forms new network. At operation 655, the network that the node device B is on assigns an event timeslot to the node device B. Thus, if the node device A network failed, the node device B can still establish the new network alone. In this way, the network is not affected by individual node device loss.

Figure 7:
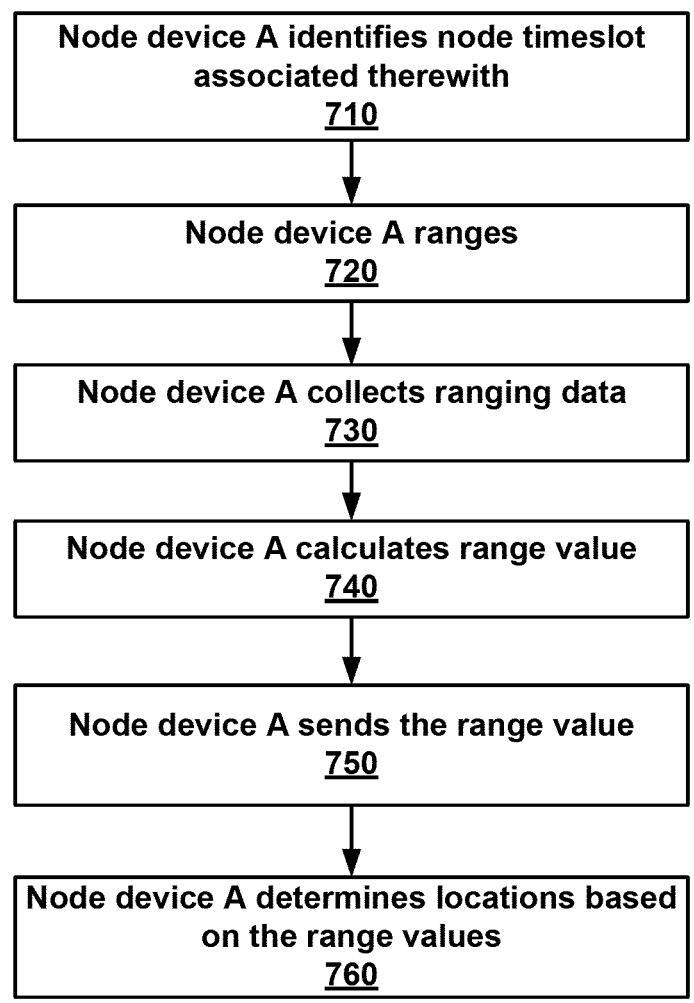
FIG. 7 is a flowchart of a process for ranging between node devices in the standard network of FIG. 2, according to an exemplary embodiment.

FIG. 7 is a flowchart of a process 700 for ranging between node devices in the standard network 200 of FIG. 2, according to an exemplary embodiment. At operation 710, node device A identifies node timeslot associated therewith. In some embodiments, the node device A is the node device 201 in FIG. 2. At operation 720, the node device A range to other node devices in the network 200 during the node timeslot associated with the node device A. In some embodiments, the other node devices are the other node devices 202 and 203 in FIG. 2. At operation 730, the node device A collects ranging data from the other node devices during the node timeslot. In some embodiments, the ranging data is the ranging data 204 in FIG. 2. At operation 740, the node device A calculates range values based on the range data. In some embodiments, the range values are the range value 205 in FIG. 2. At operation 750, the node device A sends the range values to the other node devices during the node timeslot. At operation 760, the node device A determines locations of the other devices based on the range values.

Figure 8:
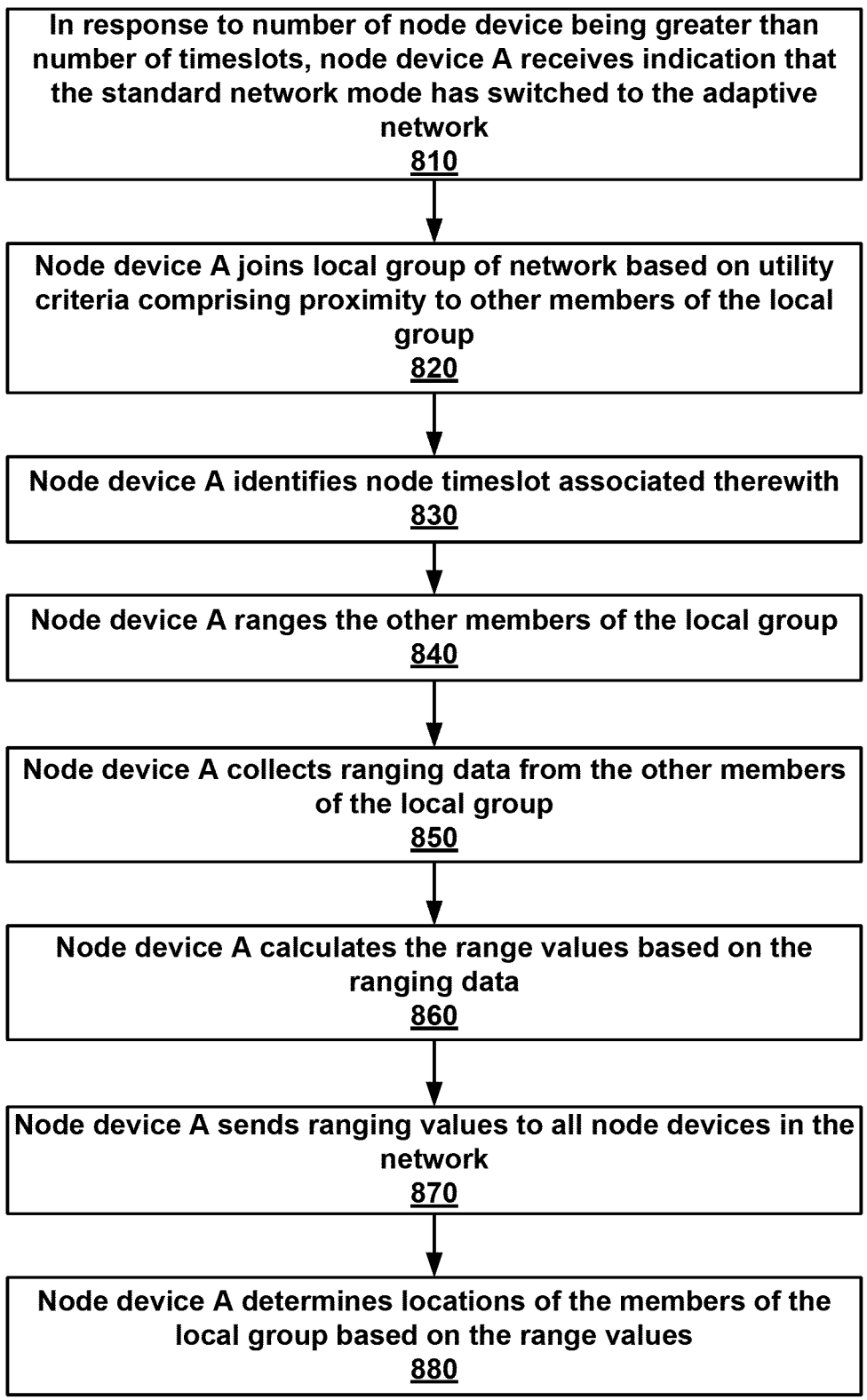
FIG. 8 is a flowchart of a process for ranging between node devices in the adaptive network of FIG. 3, according to an exemplary embodiment.

FIG. 8 is a flowchart of a process 800 for ranging between node devices in the adaptive network 300 of FIG. 3, according to an exemplary embodiment. At operation 810, in response to node devices in the network 300 that node device A has joined being greater than timeslots in the network, the node device A receives indication that the standard network 200 is has switched to the adaptive network 300. In some embodiments, the node device A is the node device 301 in FIG. 3.

At operation 820, the node device A joins a local group of the network based on utility criteria comprising proximity to other local group members of the local group. In some embodiments, the local group is the first local group 310 in FIG. 3, and the other local group members are the node devices 302 and 303 in FIG. 3. The utility criteria may also comprise a mobility state of the node device A. The mobility state may comprise a fixed state and a mobile state. The fixed state may indicate the node device A is stationary or moving at a velocity below a pre-determined velocity, and the mobile state may indicate that the node device A is moving at a velocity above the pre-determined velocity. In some embodiments, the node device A joins the local group based on the following criteria: the node device A is more proximate to an average of the other local group members than a pre-determined distance; and the node device A has the fixed state. In some embodiments, all of the other local group members have the mobile state, and the local group will perform ranging more accurately with at least one node device in the local group having the fixed state.

At operation 830, the node device A identifies a node timeslot associated with the node device A. At operation 840, the node device A ranges to the other local group members during the node timeslot. At operation 850, the node device A collects ranging data from the other local group members during the node timeslot. In some embodiments, the ranging data is the ranging data 304 in FIG. 3. At operation 860, the node device A calculates range values based on the ranging data. In some embodiments, the range values are the range values 305 in FIG. 3. At operation 870, the node device A sends the ranging values to the other local group members and second group members in a second local group of the network during the node timeslot. In some embodiments, the, the second local group is the second local group 320 in FIG. 3, and the second group members are the node devices 306, 307, and 308 in FIG. 3. At operation 880, the node device A determines locations of the other local group members based on the range values.

Figure 9:
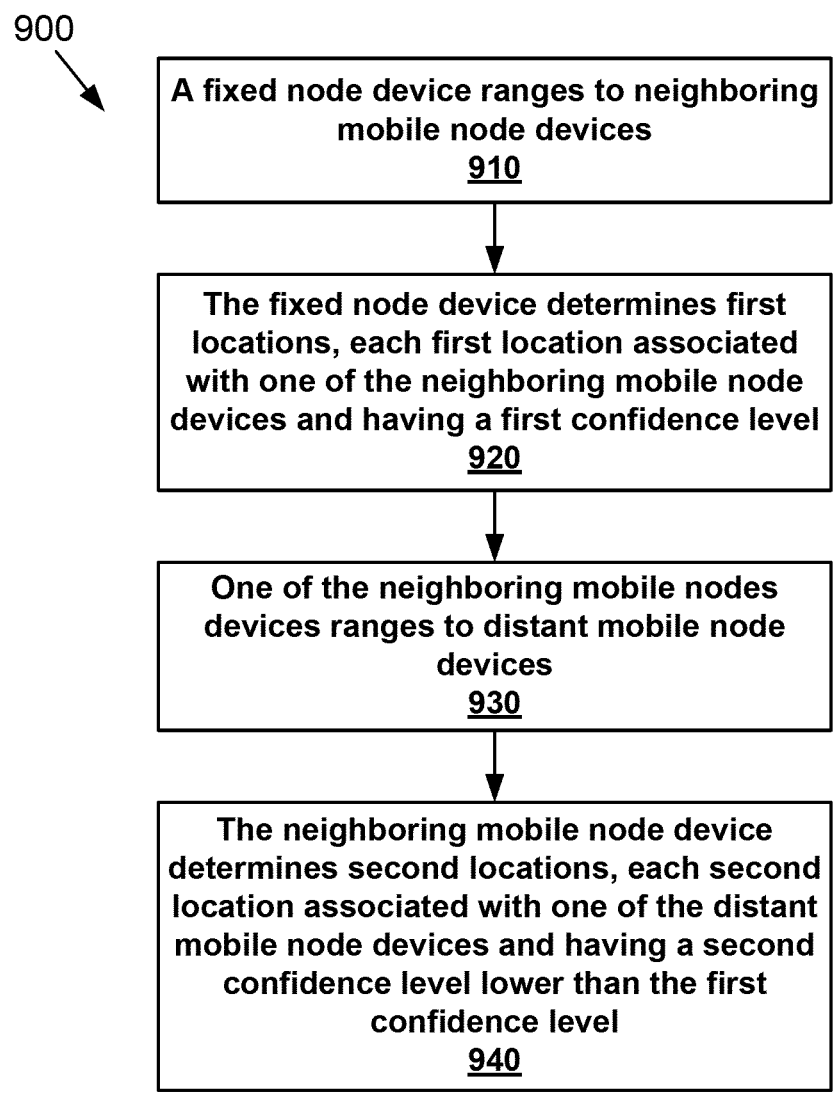
FIG. 9 is a flowchart of a process for determining locations of overlapping groups in the network of FIG. 4, according to an exemplary embodiment.

FIG. 9 is a flowchart of a process 900 for determining locations of overlapping groups comprising the first local group 410 and the second local group 420 in the network 400 of FIG. 4, according to an exemplary embodiment. At operation 910, a fixed node device ranges to neighboring node devices. In some embodiments, the fixed node device is one of the node devices 401 in FIG. 4. In some embodiments, the neighboring mobile node devices are the node devices 402 in FIG. 4. At operation 920, the fixed node device determines first locations. Each of the first locations is associated with one of the neighboring mobile node devices. Each of the first locations has a first confidence level. At operation 930, one of the neighboring mobile node devices ranges to distant mobile node devices. In some embodiments, the distant mobile node devices are the node devices 403 in FIG. 4. At operation 940, the neighboring mobile node device determines second locations. Each of the second locations is associated with one of the distant mobile node devices. Each of the second locations has a second confidence level. The second confidence level is lower than the first confidence level. The purpose of having the confidence levels is to have a metric for evaluating accuracy of the determined locations.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A network comprising:
   a first local group of first node devices, each of the first node devices within a first geographic area comprising a first processor with programmed instructions to range to other of the first node devices;
   a second local group of second node devices within a second geographic area, each of the second node devices comprising a second processor with programmed instructions to range to other of the second node devices; and
   a new node device comprising a third processor with programmed instructions to:
      make a first determination that a sum of the first local group of first node devices, the second local group of second node devices, and the new node device is greater than a plurality of timeslots associated with the network;
      responsive to the first determination:
         range to each of the first node devices;
         collect ranging data from each of the first node devices;
         calculate a plurality of distances based on the ranging data, each of the plurality of distances associated with one of the first node devices; and
         send the plurality of distances to each of the second node devices.

2. The network of claim 1, wherein the third processor has further programmed instructions to receive an indication that the network has changed from standard mode to adaptive mode in response to the first determination.

3. The network of claim 2, wherein, in response to the network changing from the standard mode to the adaptive mode, the third processor has further programmed instructions to join the first local group, range to the first node devices, collect the ranging data from the first node devices, and send the plurality of distances to the second node devices.

4. The network of claim 1, wherein the third processor has further programmed instructions to join the first local group responsive to:
the new node device being more proximate to an average of the first node devices than a pre-determined distance; and
the new node device moving at a non-zero velocity below a pre-determined velocity.

5. The network of claim 1, wherein the third processor has further programmed instructions to determine a plurality of locations based on the plurality of distances, each of the plurality of locations corresponding to one of the first node devices.

6. The network of claim 5, wherein the new node device has a fixed state indicating that the new node device is stationary or moving at a first velocity below a pre-determined velocity, wherein a dual node device of the first node devices has a mobile state indicating that the dual node device is moving at a second velocity above the pre-determined velocity, wherein a first location of the plurality of locations corresponds to the dual node device, and wherein the first location has a first confidence level associated therewith.

7. The network of claim 6, wherein the second local group comprises the dual node device, wherein the dual node device comprises a fourth processor having programmed instructions to:
range to each of the second node devices;
collect second ranging data from each of the second node devices;
calculate a plurality of second distances based on the second ranging data, each of the plurality of second distances associated with one of the second node devices; and
determine a plurality of second locations based on the plurality of second distances, each of the plurality of second locations corresponding to one of the second node devices,
wherein each of the plurality of second locations have a second confidence level associated therewith, and wherein the second confidence level is lower than the first confidence level.

8. The network of claim 1, wherein the first local group of first node devices, the second local group of second node devices, and the new node device are moving devices.

9. The network of claim 1, wherein the first local group of first node devices includes a second tag node device, wherein the third processor has programmed instructions to range to each of the first node devices at a first timeslot in response to the new node device having a first velocity less than a predetermined velocity during the first timeslot, and wherein the second tag node device has a fourth processor with programmed instructions to range to each of the first node devices at a second timeslot responsive to the second tag node device having a second velocity less than the predetermined velocity during the second timeslot.

10. A method comprising:
making a first determination, by a new node device, that a sum of a first local group of first node devices within a first geographic area, a second local group of second node devices within a second geographic area, and the new node device is greater than a plurality of timeslots associated with a network;
responsive to the first determination:
ranging, by the new node device, to each of the first local group of first node devices within the first geographic area;
collecting, by the new node device, ranging data from each of the first node devices;
calculating, by the new node device, a plurality of distances based on the ranging data, each of the plurality of distances associated with one of the first node devices; and
sending, by the new node device, the plurality of distances to each of the second local group of second node devices within the second geographic area.

11. The method of claim 10, wherein the method further comprises receiving, by the new node device, an indication that the network has changed from standard mode to adaptive mode in response to the first determination.

12. The method of claim 11, wherein joining the first local group, ranging to the first node devices, collecting the ranging data from the first node devices, and sending the plurality of distances to the second node devices are performed in response to receiving the indication that the network changes from the standard mode to the adaptive mode.

13. The method of claim 10, the method further comprising joining, by the new node device, the first local group responsive to:
the new node device being more proximate to an average of the first node devices than a pre-determined distance; and
the new node device moving at a non-zero velocity below a pre-determined velocity.

14. The method of claim 10, wherein the method further comprises determining, by the new node device, a plurality of locations based on the plurality of distances, each of the plurality of locations corresponding to one of the first node devices.

15. The method of claim 14, wherein the new node device has a fixed state indicating that the new node device is stationary or moving at a first velocity below a pre-determined velocity, wherein a dual node device of the first node devices has a mobile state indicating that the dual node device is moving at a second velocity above the pre-determined velocity, wherein a first location of the plurality of locations corresponds to the dual node device, and wherein the first location has a first confidence level associated therewith.

16. The method of claim 15, wherein the second local group comprises the dual node device, wherein the method further comprises
ranging, by the dual node device, to each of the second node devices;
collecting, by the dual node device, second ranging data from each of the second node devices;
calculating, by the dual node device, a plurality of second distances based on the second ranging data, each of the plurality of second distances associated with one of the second node devices; and
determining, by the dual node device, a plurality of second locations based on the plurality of second distances, each of the plurality of second locations corresponding to one of the second node devices,
wherein each of the plurality of second locations have a second confidence level associated therewith, and wherein the second confidence level is lower than the first confidence level.

17. The method of claim 10, wherein the first local group of first node devices, the second local group of second node devices, and the new node device are moving devices.

18. A non-transitory computer-readable storage medium having instructions stored thereon that, upon execution by a computing device, causes the computing device to perform operations comprising:
making a first determination that a sum of a first local group of first node devices within a first geographic area, a second local group of second node devices within a second geographic area, and a new node device is greater than a plurality of timeslots associated with a network;
responsive to the first determination:
ranging to each of the first local group of first node devices within the first geographic area;
collecting ranging data from each of the first node devices;
calculating a plurality of distances based on the ranging data, each of the plurality of distances associated with one of the first node devices; and
sending the plurality of distances to each of the second local group of second node within the second geographic area.

19. The storage medium of claim 18, wherein the operations further comprise receiving an indication that the network has changed from standard mode to adaptive mode in response to the first determination.

20. The storage medium of claim 18, wherein the first local group of first node devices, the second local group of second node devices, and the new node device are moving devices.

* * * * *